(12) United States Patent
Lindell et al.

(10) Patent No.: US 10,840,042 B2
(45) Date of Patent: Nov. 17, 2020

(54) METHOD OF PERFORMING A CIRCUIT-BREAKING AND CLOSING OPERATION

(71) Applicant: ABB Schweiz AG, Baden (CH)

(72) Inventors: Elisabeth Lindell, Västerås (SE); Stefan Halén, Västerås (SE); Lars Jonsson, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/826,141

(22) Filed: Mar. 20, 2020

(65) Prior Publication Data

US 2020/0312592 A1 Oct. 1, 2020

(30) Foreign Application Priority Data

Mar. 29, 2019 (EP) .................................... 19166240

(51) Int. Cl.
*H01H 33/02* (2006.01)
*H01H 33/59* (2006.01)
(Continued)

(52) U.S. Cl.
CPC ........ *H01H 33/022* (2013.01); *H01H 9/0072* (2013.01); *H01H 9/563* (2013.01); *H01H 33/593* (2013.01); *H05B 7/02* (2013.01)

(58) Field of Classification Search
CPC .... H01H 33/022; H01H 33/593; H01H 33/60; H01H 9/0072; H01H 9/563; H01H 71/12;
(Continued)

(56) References Cited

U.S. PATENT DOCUMENTS 2,731,594 A * 1/1956 Rockafellow ......... H02M 1/045
323/212
3,366,725 A * 1/1968 Watterson ................ H05B 7/02
373/103
(Continued)

FOREIGN PATENT DOCUMENTS

DE 3833166 A1 3/1990
EP 3358588 A1 8/2018
GB 752084 A 7/1956

OTHER PUBLICATIONS

European Search Report Application No. EP 19 16 6240 Completed: Sep. 6, 2019; dated Sep. 9, 2019 8 pages.

*Primary Examiner* — William A Bolton
(74) *Attorney, Agent, or Firm* — Whitmyer IP Group LLC

(57) ABSTRACT

A method of performing a circuit-breaking and closing operation in a three-phase system having a first phase, a second phase lagging the first phase by 120°, and a third phase lagging the first phase by 240°, includes: a) opening only one of the first phase, the second phase and the third phase before a zero crossing of a current of the corresponding phase, b) opening the remaining phases of the first phase, the second phase and the third phase after step a), and c) closing the first phase, the second phase and the third phase simultaneously or essentially simultaneously at a phase to ground voltage of the phase of the first phase, the second phase and the third phase which lagging the phase that was opened in step a) by 120° in a time range from 60° before a peak of the phase to 90° after the peak.

12 Claims, 4 Drawing Sheets

(51) Int. Cl.
 *H01H 9/00* (2006.01)
 *H01H 9/56* (2006.01)
 *H05B 7/02* (2006.01)

(58) Field of Classification Search
 CPC ........ H05B 7/02; G01R 19/165; H02H 3/021; H02H 3/06; H02H 3/08
 USPC ............. 218/100, 80, 79; 323/212, 235, 319
 See application file for complete search history.

(56) References Cited

U.S. PATENT DOCUMENTS

| | | |
|---|---|---|
| 6,362,445 B1 | 3/2002 | Marchand et al. |
| 7,741,937 B2 * | 6/2010 | Mori .................... H01H 33/593 335/2 |
| 7,787,228 B2 * | 8/2010 | Koyama ................. H02P 13/00 361/78 |
| 8,212,423 B2 * | 7/2012 | Saito ........................ H01H 9/56 307/127 |
| 2004/0245964 A1 * | 12/2004 | Schoonenberg ....... H01H 9/563 323/210 |
| 2006/0274459 A1 | 12/2006 | Zhou et al. |
| 2014/0266521 A1 | 9/2014 | Kinsella et al. |
| 2015/0171626 A1 | 6/2015 | Koshizuka et al. |

* cited by examiner

METHOD OF PERFORMING A CIRCUIT-BREAKING AND CLOSING OPERATION

TECHNICAL FIELD

The present disclosure generally relates to a method of performing a circuit-breaking and closing operation.

BACKGROUND

Circuit breakers may in certain applications be subjected to a great plurality of circuit-breaking operations. In for example arc furnace applications the circuit breakers wear out very quickly, due to that they are operated extremely frequently, around 100 times per day.

Earlier, circuit breakers used for operating arc furnaces were not synchronized. This leads to severe contact wear, especially considering that arc furnace circuit breakers are operated so frequently. It also leads to severe transient stresses in the system; both re-ignitions at opening of the circuit breaker and inrush currents to the arc furnace transformer at closing.

EP3358588 A1 discloses a three-phase circuit breaker for which the first phase is opened before a zero crossing in this phase, wherein the second and third phases are opened a quarter of a period after opening of the first phase. The first and second phases are closed at the peak voltage between the first and second phases and the third phase is closed a quarter of a period later.

SUMMARY

An object of the present disclosure is to provide a method of performing a circuit-breaking and closing operation which solves, or at least mitigates, the problems of the prior art.

There is hence according to a first aspect of the present disclosure provided a method of performing a circuit-breaking and closing operation in a three-phase system having a first phase, a second phase lagging the first phase by 120°, and a third phase lagging the first phase by 240°, wherein the method comprises: a) opening only one of the first phase, the second phase and the third phase before a zero crossing of a current of the corresponding phase, b) opening the remaining phases of the first phase, the second phase and the third phase after step a), and c) closing the first phase, the second phase and the third phase simultaneously or essentially simultaneously at a phase to ground voltage of the phase of the first phase, the second phase and the third phase which is lagging the phase that was opened in step a) by 120° in a time range from 60° before a peak of said phase to 90° after the peak.

This synchronization of the circuit-breaking and closing operation prolongs the life of a circuit breaker. Transient overvoltage's due to re-ignitions will not occur or at least be substantially reduced, and inrush currents will generally be kept below the nominal current.

With the term "essentially" hereabove is meant within a time range of the order of one or more tenths of a millisecond.

With the term "opening" is herein meant contact separation. What is controlled by the opening is achieving contact separation. By the term "closing" is herein meant achieving contact touch. What is controlled by the closing is achieving contact touch.

According to one embodiment the time range is from 30° before the peak to 60° after the peak.

According to one embodiment the time range is from 10° before the peak to 30° after the peak.

According to one embodiment the time range is from 10° before the peak to 25° after the peak.

According to one embodiment the phase to ground voltage is that at the peak.

According to one embodiment in step a) the zero crossing is a zero crossing occurring when the current goes from a negative value towards a positive value, wherein the peak is a negative peak, or the zero crossing is a zero crossing occurring when the current goes from positive towards negative, wherein the peak is a positive peak.

It has in particular been found by the present inventors that the combination of opening just before a negative towards positive zero crossing with the closing in the negative peak region as specified above, or alternatively opening just before positive towards negative zero crossing with closing in the positive peak region provide the smallest inrush currents upon closing.

According to one example both combinations identified above may be performed interchangeably over a large plurality of circuit-breaking and closing operations. Hence, for some circuit-breaking and closing operations the zero crossing may occur when the current goes from positive towards negative and for other circuit-breaking and closing operations the zero crossing may occur when the current goes from a negative value towards a positive value. Since the closing may at some occasions occur in a region of positive peak values and on some occasion in a region of negative peak values in the respective phases, the direction of the charge transport is altered between circuit-breaking and closing operations seen over a large number of such operations. The contacts of the circuit breaker may thereby be subjected to less wear.

One embodiment comprises selecting the phase opened in step a) such that the first phase, the second phase and the third phase are opened equally or about equally often over 100, 500 or 1000 circuit-breaking and closing operations.

It has been found by the inventors that the present method may cause a high voltage step to occur in one of the phases at each closing operation. Since the circuit breaker contact wear is proportional to the prestrike energy, i.e. the amplitude of the voltage step, the wear of one phase of the circuit breaker will be larger than the wear of the other phases. Hence, by means of opening different phases in step a) and therefore closing around peak regions of different phases, for different circuit-breaking and closing operations in a manner such that statistically, in a large number of circuit-breaking and closing operations each phase has been opened about an equal number of times first in step a) the wear of the contact pair of a particular phase of the circuit breaker may be reduced as the wear is spread between all three phases.

There are many variations of how to select the phase to be opened in step a), for example sequentially for each circuit-breaking and closing operation, e.g. the first phase in a first circuit-breaking and closing operation, the second phase in the subsequent circuit-breaking and closing operation, then the third phase and so on or any variation thereof, or a certain phase may be selected consecutively a predetermined number of times in step a) before another phase is selected consecutively a predetermined number of times, etc.

According to one embodiment in step b) the remaining phases are opened a quarter of a period after the opening of the phase in step a).

There is according to a second aspect of the present disclosure provided a computer program comprising computer code which when executed by processing circuitry of a control system causes the control system to perform the method according to the first aspect.

There is according to a third aspect of the present disclosure provided a control system for performing a circuit-breaking and closing operation in a three-phase system having a first phase, a second phase lagging the first phase by 120°, and a third phase lagging the first phase by 240°, wherein the control system comprises: processing circuitry, and a storage medium comprising computer code which when executed by the processing circuitry causes the control system to perform the method according to the first aspect.

There is according to a fourth aspect of the present disclosure provided a system comprising: a control system as claimed according to the third aspect, a circuit breaker system having a first pole, a second pole and a third pole, and three actuating devices, each actuating device being configured to actuate a respective one of the first pole, the second pole and the third pole, wherein the control system is configured to control the actuating devices.

The actuating devices may for example be motors, spring actuators or magnetic actuators.

According to one embodiment the circuit breaking system is an electric arc furnace circuit breaking system.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
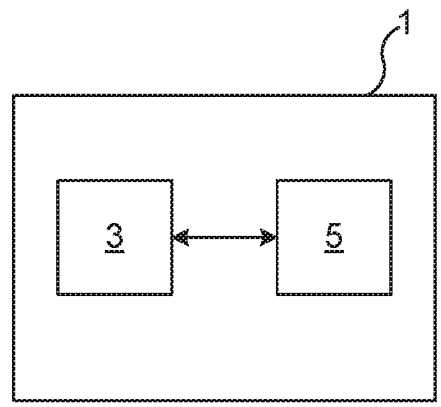
FIG. 1 is a schematic block diagram of a control system configured to perform a circuit-breaking and closing operation.

FIG. 1 shows an example of a control system 1 for performing a circuit-breaking and closing operation. The control system 1 comprises processing circuitry 3 and a storage medium 5.

The processing circuitry 3 may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed circuit-breaking and closing operations.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
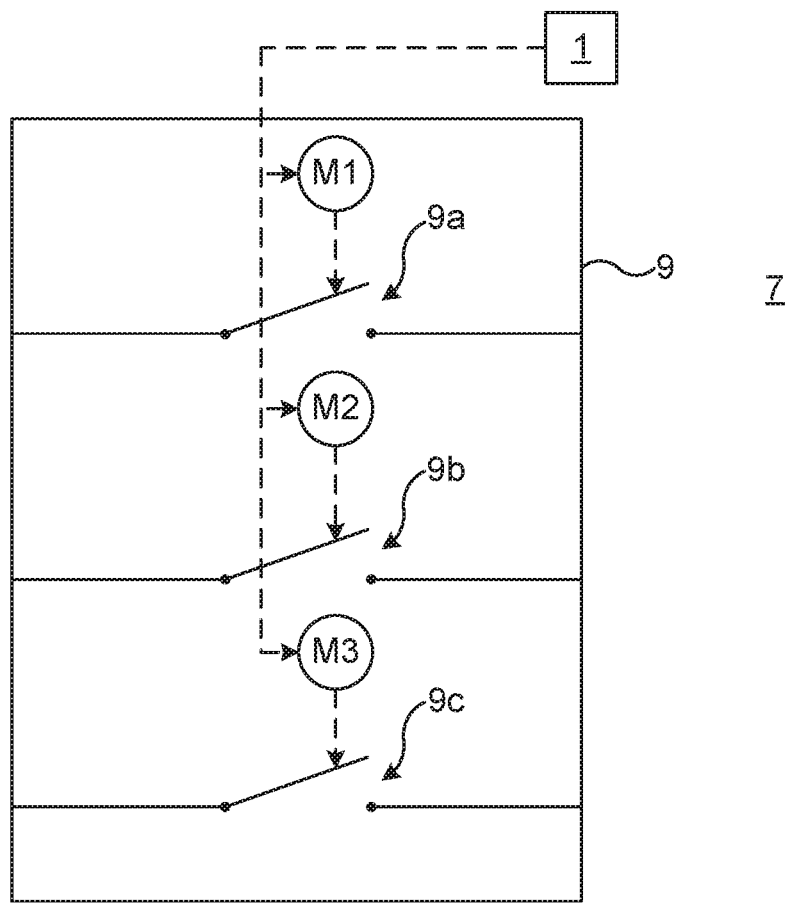
FIG. 2 schematically shows a circuit-breaking system including the control system in FIG. 1.

Turning now to FIG. 2, an example of a system 7 is shown. The system 7 comprises the control system 1, a circuit breaker system 9, and actuating devices, in the following exemplified by motors M1-M3. Other examples of actuating devices are spring actuators and magnetic actuators.

The exemplified circuit breaker system 9 is a three-phase circuit breaker. The circuit breaker 9 hence has three pairs of contacts or poles 9a-9c. Each pair of contacts may for example comprise a movable contact and a fixed contact. Each pair of contacts 9a-9c is configured to be connected to a respective electrical phase. The circuit breaker system 9 is configured to break partly or purely inductive loads. In an example where the circuit breaking system is for electric arc furnace applications, one of the contacts of each pair of contacts 9a-9c may also be connected to e.g. the electrodes of an electric arc furnace, typically via a transformer. Alternatively, the circuit breaker system could comprise three single-phase circuit breakers, three single-phase switches or a three-phase switch, three single-phase contactors or a three-phase contactor, or three single-phase load break switches or a three-phase load break switch.

The control system 1 is configured to control the motors M1-M3. Each motor M1-M3 is configured to operate a respective one of the movable contacts of the pairs of contacts 9a-9c, between an open position and a closed position based on control signals received from the control system 1.

The control system 1 is configured to be provided with data relating to the currents flowing through the electrical phases when the circuit breaker system 9 is in a closed state. The control system 1 is configured to determine when to open the electrical phases, i.e. when to open one of the pairs of contacts 9a-9c, the other two pairs of contacts 9a-9c, and to send control signals to the motors M1-M3 to initiate a circuit-breaking and closing operation based on this determination.

The control system 1 is configured to be provided with data relating to the voltages in the electrical phases on the grid side of the circuit breaker system 9. The control system 1 is configured to determine when to close the pairs of contacts 9a-9c, and to send control signals to the motors M1-M3 to close all of the electrical phases simultaneously based on the voltage of at least one of the electrical phases.

Examples of when the contacts are opened and when they are closed will be described with reference to FIGS. 3-6b.

Figure 3:
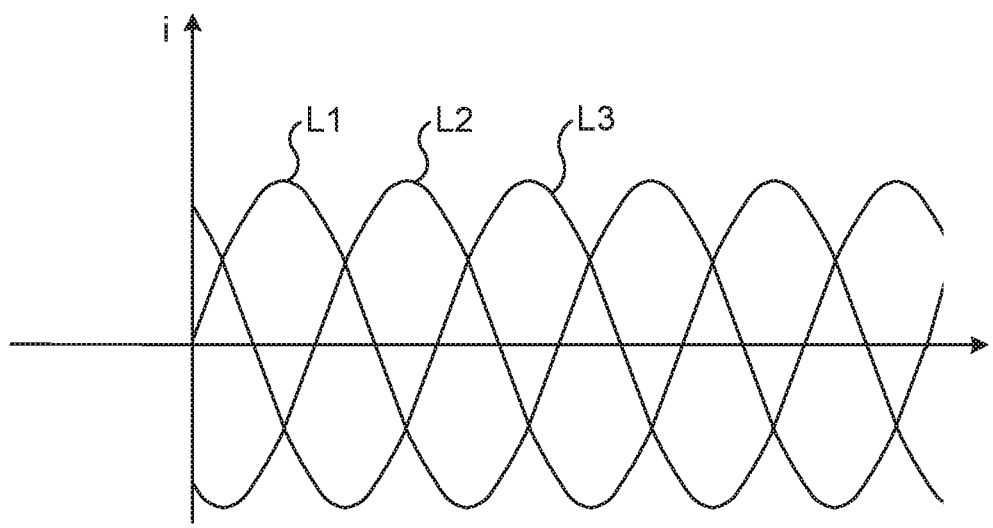
FIG. 3 shows a graph with a definition of the electrical phases.

FIG. 3 schematically depicts three electrical phases as defined herein. A first phase L1 is the reference phase, wherein a second phase L2 is lagging the first phase L1 by 120°. A third phase L3 is lagging the first phase L1 by 240°. The third phase L3 is hence lagging the second phase L2 by 120°.

Figure 4:
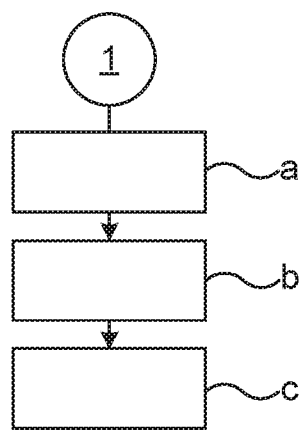
FIG. 4 is a flowchart of a method of performing a circuit-breaking and closing operation.

FIG. 4 is a flowchart of a method of performing a circuit-breaking and closing operation by means of the control system 1.

In a step a) only one of the first phase L1, the second phase L2 and the third phase L3 is opened. The opening is before a zero crossing of the current in the phase in question. Hereto, the control system 1 is configured to provide a control signal to one of the motors M1-M3 to open the corresponding pair of contacts/poles 9a-9c.

Figure 5:
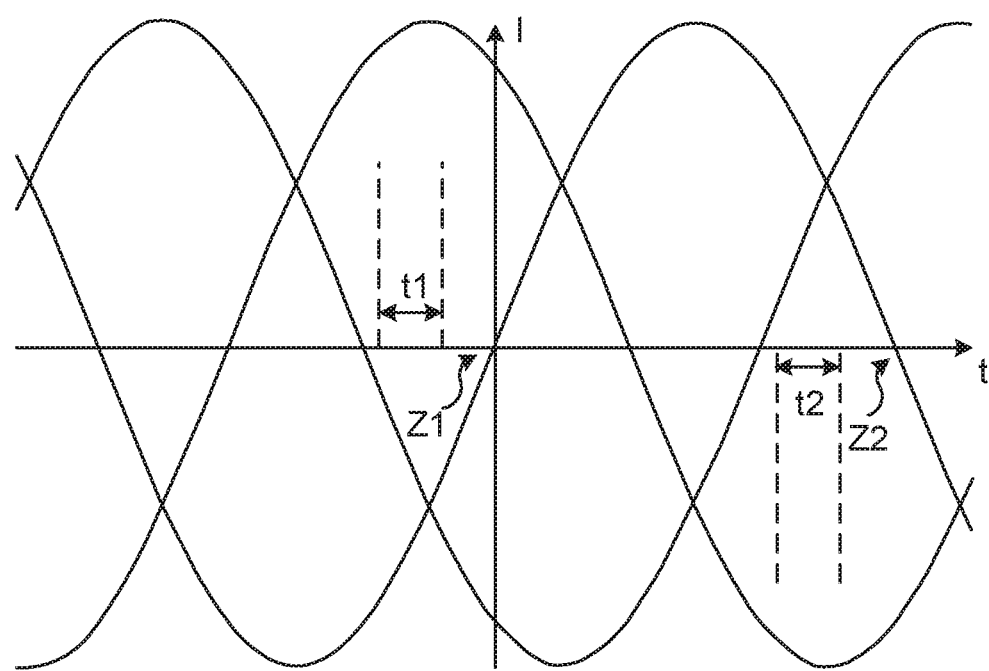
FIG. 5 shows a graph with the opening time of one of the phases indicated.

The zero crossing may be a zero crossing occurring when the current goes from a negative value towards a positive value or from a positive value towards a negative value. This situation is also illustrated in FIG. 5.

The terms "before a zero crossing" typically means a time range of less than one full cycle of the phase current divided by six to 1 millisecond before the zero crossing of the current, such as 1-3 milliseconds before the zero crossing of the current for a 50 Hz system or 1-2 milliseconds, or 1-1.5 milliseconds before the zero crossing of the current, or 1-2.5 milliseconds before a zero crossing for a 60 Hz system. Schematic examples of such time ranges are shown in FIG. 5 where time range t1 indicates an exemplified time range for the negative towards positive current value and the zero crossing Z1 and time range t2 indicates an exemplified the time range for the positive towards negative current value and the zero crossing Z2.

The control system 1 is configured to monitor the current and/or the voltage and power factor in at least one of the first phase L1, the second phase L2, and the third phase L3 in order to be able to determine when a zero crossing of a particular phase is going to occur. Step a) is performed based on the determination of the current in at least one of the phases L1-L3.

In a step b) the other two phases which were not opened in step a) are opened. These phases are preferably opened a quarter of a period or 90° after the opening of the phase in step a). These two phases are hence opened simultaneously in step b). The control system 1 may hence provide control signals to the remaining two motors M1-M3 to open the remaining closed pairs of contacts 9a-9c.

Figure 6A:
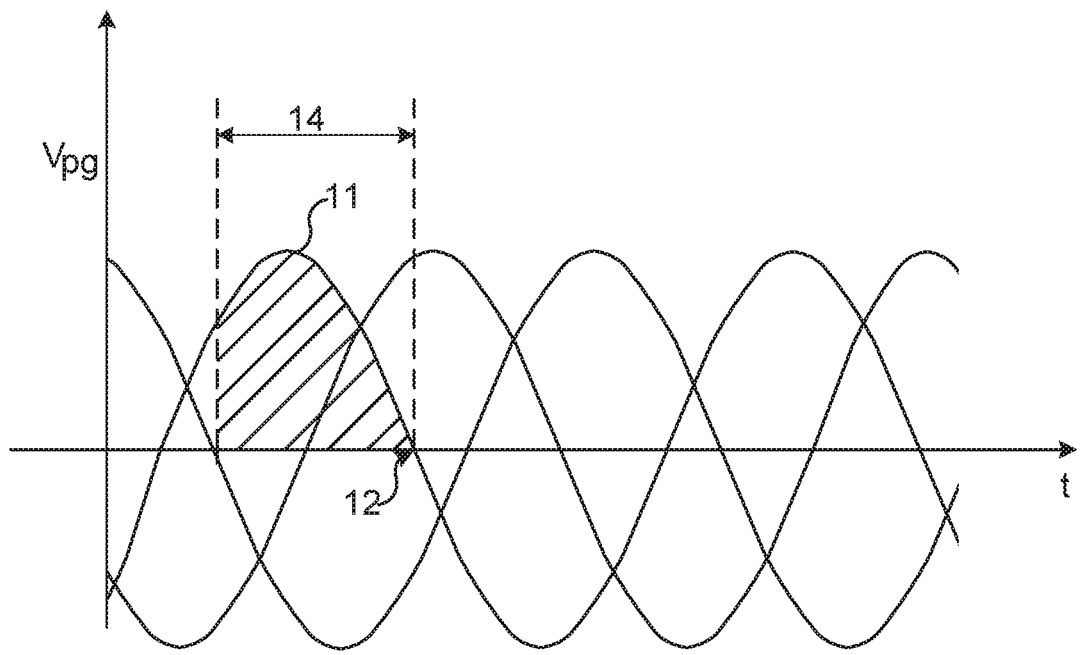
FIGS. 6a-6b show graphs illustrating the closing time of the electrical phases.
Figure 6B:
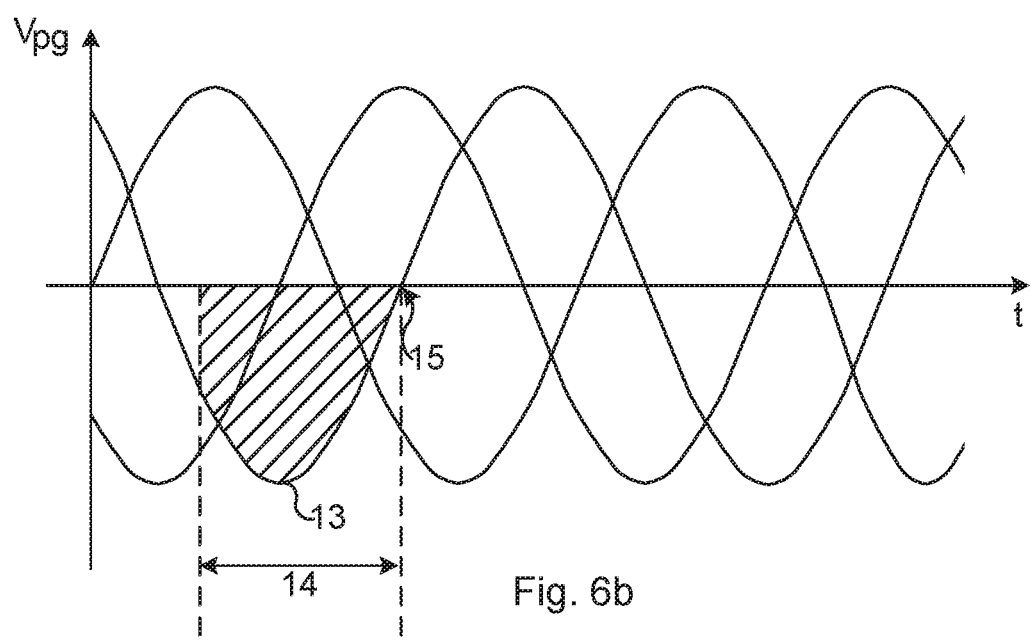

In a step c), the first phase L1, the second phase L2 and the third phase L3 are closed simultaneously or essentially simultaneously. The first phase L1, the second phase L2, and the third phase L3 are closed at a phase to ground voltage in a time range 14 limited to from 60° before a peak 11, 13 shown in FIGS. 6a and 6b, to 90° after the peak 11, 13 of that phase L1-L3 which is lagging the phase L1-L3 which was opened in step a) by 120°. This corresponds to the subsequent zero crossing 12, 15 from the peak 11, 13. This situation is shown in FIG. 6a for a positive peak 11 and in FIG. 6b for a negative peak 13.

Thus, if in step a) the first phase L1 is opened, then the applicable phase to ground voltage that is to be taken into account in step c) is that of the second phase L2. If the second phase L2 is opened in step a), the applicable phase to ground voltage that is to be taken into account is that of the third phase L3. If the third phase L3 is opened in step a), the applicable phase to ground voltage that is to be taken into account is that of the first phase L1.

It should be noted that a circuit breaking and closing operation must not necessarily be performed within a short amount of time, e.g. within seconds. There may sometimes elapse minutes, hours or even days from the circuit breaking operation to the circuit closing operation.

In case the zero crossing of the current in step a) is from a negative value towards a positive value, the peak 13 in step c) is preferably a negative peak 13. In case the zero crossing in step a) is from positive towards negative, the peak 11 in step c) is preferably a positive peak 11.

According to one example, the time range 14 is more narrow, such as limited from 30° before the peak to 60° after the peak 11, 13 of that phase L1-L3 which is lagging the phase L1-L3 which was opened in step a) by 120°, or limited from 10° before the peak to 25° after the peak 11, 13 of that phase L1-L3 which is lagging the phase L1-L3 which was opened in step a) by 120°.

According to one example the time range 14 is a single point which is the peak 11, 13. The phase to ground voltage is hence in this example that at the peak 11, 13. Alternatively, the time range 14 is a single point which is at the zero crossing subsequent 12, 15 to the peak 11, 13.

The control system 1 may be configured to send control signals to all of the motors M1-M3 to perform step c). The control system 1 may be configured to obtain a voltage of at least one of the phases L1-L3 in order to determine when to perform the closing of the motors M1-M3.

According to one example, the phase L1-L3 opened in step a) may be varied for different circuit-breaking and closing operations. The control system 1 may hence select which of the phases L1-L3 to open first in step a) of a circuit-breaking and closing operation. The pairs of contacts 9a-9c will thereby be subjected to less wear over time. There are many possible ways to perform permutations of the phase L1-L3 to be opened in step a). For example, each phase L1-L3 may be opened first a predetermined number of times consecutively, i.e. for a plurality of circuit-breaking and closing operations, before shifting to another phase L1-L3, which is also opened a predetermined number of times first, and so on. According to another example, the first phase opened may be alternated for example by first opening the first phase L1, then the second phase L2, then the third phase L3 and so on. In general, for a large amount of circuit-breaking and closing operations, such as 100, 500 or 1000 circuit-breaking and closing operations, all the phases L1-L3 may beneficially be opened first an equal number of times or about an equal number of times.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of performing a circuit-breaking and closing operation in a three-phase system having a first phase, a second phase lagging the first phase by 120°, and a third phase lagging the first phase by 240°, wherein the method comprises:
   a) opening only one of the phases before a zero crossing of a current of said only one phase,
   b) opening the other two phases after step a), and
   c) closing the first phase, the second phase, and the third phase simultaneously or essentially simultaneously at a phase to ground voltage of that phase which is lagging said only one phase by 120° in a time range from 60° before a peak of that phase which is lagging said only one phase by 120° to 90° after the peak.

2. The method as claimed in claim 1, wherein the time range is from 30° before the peak to 60° after the peak.

3. The method as claimed in claim 1, wherein the time range is from 10° before the peak to 30° after the peak.

4. The method as claimed in claim 1, wherein the time range is from 10° before the peak to 25° after the peak.

5. The method as claimed in claim 1, wherein the phase to ground voltage is that at the peak.

6. The method as claimed in claim 1, wherein in step a) the zero crossing is a zero crossing occurring when the current goes from a negative value towards a positive value, wherein the peak is a negative peak, or the zero crossing is a zero crossing occurring when the current goes from positive towards negative, wherein the peak is a positive peak.

7. The method as claimed in claim 1, comprising selecting said only one phase opened in step a) such that the first phase, the second phase and the third phase are opened equally or about equally often over 100, 500 or 1000 circuit-breaking operations.

8. The method as claimed in claim 1, wherein in step b) the other two phases are opened a quarter of a period after an interruption of said only one phase in step a).

9. A non-transitory computer-readable medium storing a computer program comprising computer code which when executed by processing circuitry of a control system causes the control system to perform a method including:
  a) opening only one of the phases before a zero crossing of a current of said only one phase,
  b) opening the other two phases after step a), and
  c) closing the first phase, the second phase, and the third phase simultaneously or essentially simultaneously at a phase to ground voltage of that phase which is lagging said only one phase by 120° in a time range from 60° before a peak of that phase which is lagging said only one phase by 120° to 90° after the peak.

10. A control system for performing a circuit-breaking and closing operation in a three-phase system having a first phase, a second phase lagging the first phase by 120°, and a third phase lagging the first phase by 240°, wherein the control system comprises:
  processing circuitry, and
  a storage medium including computer code which when executed by the processing circuitry causes the control system to perform a method which includes:
    a) opening only one of the phases before a zero crossing of a current of said only one phase,
    b) opening the other two phases after step a), and
    c) closing the first phase, the second phase, and the third phase simultaneously or essentially simultaneously at a phase to ground voltage of that phase which is lagging said only one phase by 120° in a time range from 60° before a peak of that phase which is lagging said only one phase by 120° to 90° after the peak.

11. A system comprising:
  the control system as claimed in claim 10,
  a circuit breaker system having a first pole, a second pole and a third pole, and
  three actuating devices, each actuating device being configured to actuate a respective one of the first pole, the second pole, and the third pole, wherein the control system is configured to control the actuating devices.

12. The system as claimed in claim 11, wherein the system is an electric arc furnace circuit breaking system.

* * * * *